United States Patent [19]

Chiasson

[11] Patent Number: 5,173,961
[45] Date of Patent: Dec. 22, 1992

[54] TELECOMMUNICATIONS CABLE WITH RIPCORD REMOVAL FOR METAL SHEATH

[75] Inventor: David W. Chiasson, Saskatoon, Canada

[73] Assignee: Northern Telecom Limited, Montreal, Canada

[21] Appl. No.: 808,248

[22] Filed: Dec. 12, 1991

[51] Int. Cl.⁵ .............................................. G02B 6/44
[52] U.S. Cl. .................................... 385/113; 385/112
[58] Field of Search ............... 385/113, 109, 110, 111, 385/112, 114

[56] References Cited

U.S. PATENT DOCUMENTS

| | | |
|---|---|---|
| 4,784,461 | 11/1988 | Abe et al. .......................... 385/113 X |
| 4,844,575 | 7/1989 | Kinard et al. ........................ 385/113 |
| 4,893,893 | 1/1990 | Claxton et al. ....................... 385/108 |
| 5,050,957 | 9/1991 | Hamilton et al. .................... 385/113 |
| 5,062,685 | 11/1991 | Cain et al. ............................ 385/114 |

Primary Examiner—John D. Lee
Assistant Examiner—Phan T. Heartney
Attorney, Agent, or Firm—R. J. Austin

[57] ABSTRACT

In optic cable there is provided a ripcord which lies partly within the sheath and partly outside the sheath by extending between overlapped edges of the sheath. Parts of the ripcord outside the sheath and spaced along the cable and are accessible by removal of directly overlying regions of jacket. No cutting of the sheath is required to access the ripcord which, however, after access may be used for ripping along the sheath.

6 Claims, 2 Drawing Sheets

TELECOMMUNICATIONS CABLE WITH RIPCORD REMOVAL FOR METAL SHEATH

BACKGROUND OF THE INVENTION

1. Field of the Invention

This invention relates to a telecommunications with ripcord removal for a metal sheath.

2. Description of Related Art

In present telecommunication cable designs, ripcords are incorporated beneath metal sheaths for the purpose of opening the sheaths thereby giving access to the cable cores. Problems are associated with obtaining access to the ripcords by any present method before the sheaths may be opened, and these methods include distortion of the telecommunications cable by a bending operation to render the ripcord available at a particular location. By way of example, in the case of an optical cable it is necessary as part of the ripcord access procedure to bend the cable at a chosen location to expose the ripcord at a cut which has been previously provided around the cable jacket and through the sheath. A sharp extraction tool is then required to pass beneath the ripcord and to withdraw it outwardly through the cut.

In the case of all optical cables incorporating ripcords, there is thus a problem in obtaining access to ripcords. Further to this, in the case of optical cable, bending of a cable may result in undue bending or even pinching of fibers thereby increasing attenuation and fiber breakage. Additionally, where the optical cable structure includes tubes housing fibers, the tubes may become damaged because of such bending procedures. Also, the use of a sharp extraction tool may result in damage to parts of a cable core, i.e. in the case of optical cables, damage to the optical tubes or fibers.

SUMMARY OF THE INVENTION

The present invention seeks to provide a telecommunications cable, particularly an optical cable, which will negate or minimize the above problems.

Accordingly, the present invention provides a telecommunications cable comprising a core including elongate transmission elements, a sheath extending around the core, the sheath having overlapped edge regions extending longitudinally of the cable, an elastomeric jacket surrounding the sheath, and at least one ripcord, the ripcord extending longitudinally along the cable and alternating between lengths of the ripcord which are disposed radially outside the sheath, the ripcord extending between the overlapped edge regions as it alternates between positions inside and outside the sheath.

More particularly, the present invention includes an optical cable having a core which includes at least one optical fiber extending longitudinally along the core, the sheath extending around the core with overlapped edge regions, an elastomeric jacket and a ripcord, the ripcord being disposed radially within the sheath and then outside the sheath in alternating fashion as defined in the last preceding paragraph.

The invention also includes a method of making a telecommunications cable comprising moving a cable core along a passline while simultaneously wrapping a sheath around the core with longitudinally extending edge regions of the sheath overlapping one over the other, and positioning a ripcord longitudinally of the core, the ripcord alternating between lengths of ripcord which lie radially within the sheath and lengths of ripcord which are disposed radially outside the sheath, the ripcord extending between the overlapped edge regions as it alternates between positions inside and outside the sheath.

As may be seen from the above telecommunications cable construction and which may be prepared by the method of the invention, while the ripcord is necessarily positioned inside the sheath for the purpose of opening the sheath to gain access to the cable core, nevertheless the ripcord also lies outside the sheath along specific lengths of cable so as to be accessible, after cutting through the cable jacket, without first having to sever through the sheath and bending the cable to expose a length of the ripcord.

In a practical construction, a length of cable jacket may be removed to obtain access to a length of ripcord which extends outside of the sheath, thereby obtaining access to the ripcord which then may be easily used for the purpose of ripping open the sheath.

BRIEF DESCRIPTION OF THE DRAWINGS

One embodiment of the invention will now be described by way of example, with reference to the accompanying drawings, in which.

DESCRIPTION OF THE PREFERRED EMBODIMENT

Figure 1:
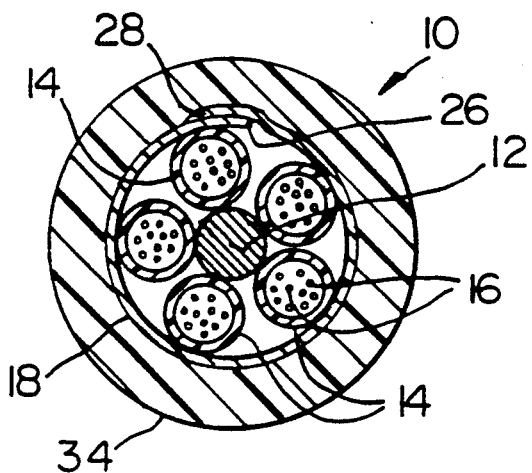
FIG. 1 is a lateral cross-sectional view through an optical cable according to the embodiment.
Figure 2:
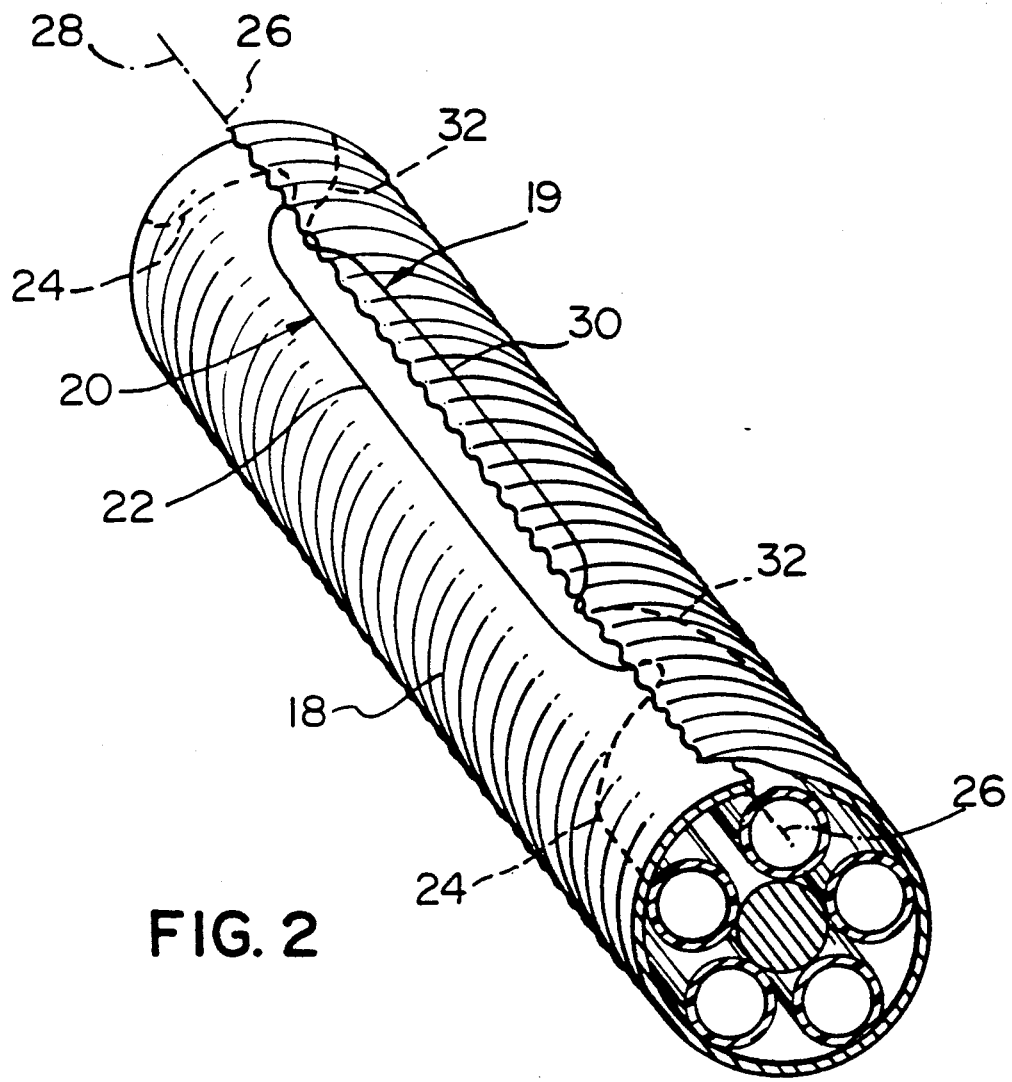
FIG. 2 is a partially diagrammatic isometric view of the cable of FIG. 1 with the cable jacket omitted.

As shown in FIG. 1, an optical cable 10 of the embodiment comprises a cable core consisting of a central longitudinally extending tensile strength member 12 surrounded by a plurality, namely five, tubes 14 which extend longitudinally of the core while being wrapped helically around the strength member 12 either in a single direction or in alternating directions. In the drawings the tubes are shown spaced apart for clarity. However, in practice it would normally be expected for the tubes to contact each other. Within each tube are enclosed a plurality of optical fibers 16. As may be seen from FIG. 1 and particularly from FIG. 2, the cable includes a corrugated steel sheath 18 and two ripcords 19 and 20. As may be seen from FIG. 2, each of the ripcords 19 and 20 alternates longitudinally of the cable from lengths of ripcord which lie radially within the sheath to lengths of ripcord which lie radially outside the sheath. Each ripcord alternates between its lengths inside and outside of the sheath by the ripcord passing around an edge of the sheath. More particularly, the ripcord 20 has lengths 22 which lie outside the sheath and lengths 24 which lie inside the sheath with these lengths being connected together by the ripcord extending around one longitudinal edge region 26 of the sheath. In contrast, the ripcord 19 extends around the opposite edge region 28 of the sheath to have lengths 30 on the outside of the sheath and lengths 32 inside the sheath. The two ripcords are applied so that each length 22 of the ripcord 20 is in phase with a length 30 of the ripcord 19 along the same length of cable and the length 30 is shorter than the length 22 so as to avoid crossing of the ripcords one over the other as they extend along the cable. This is clear from FIG. 2. Surrounding the cable sheath is a polyethylene jacket 34 formed by normal extrusion techniques.

Figure 3:
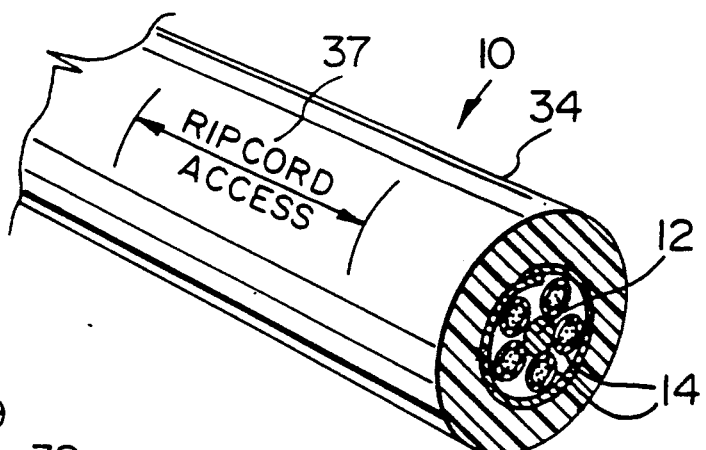
FIG. 3 is a view similar to FIG. 2 but including the jacket.

During manufacture, a printed designation is preferably added at intervals along the outside of the cable jacket for instance as shown at 37 by FIG. 3, to indicate to an installer of cable positions of the lengths 22 and 30 of the two ripcords. The ripcord access designation may for instance be as shown by FIG. 3 or by any other acceptable designation provided by the cable manufacturer.

As may be seen from the above embodiment, it is totally unnecessary to bend the cable to obtain access to the ripcords or to use sharp tools for ripcord extraction and which could cause damage to parts of the cable core. With the embodiment of the present invention, the installer merely needs to remove a length of cable jacket in the designated region for instance as shown by FIG. 3, to expose outer lengths 22 and 30 of the two ripcords. Each ripcord may then be severed along the length 22 or 30 to provide the installer with two ripcord ends on each ripcord. The two ripcords may then be pulled in the appropriate direction to tear through the steel sheath 18, and the jacket 34 for a length along the cable sufficient to expose the core for installation purposes. As may be seen therefore, as the cable is not bent for access to ripcords and a cutting tool does not pass through the sheath, no damage is caused to elements within the core during exposure of or use of the ripcords.

Figure 4:
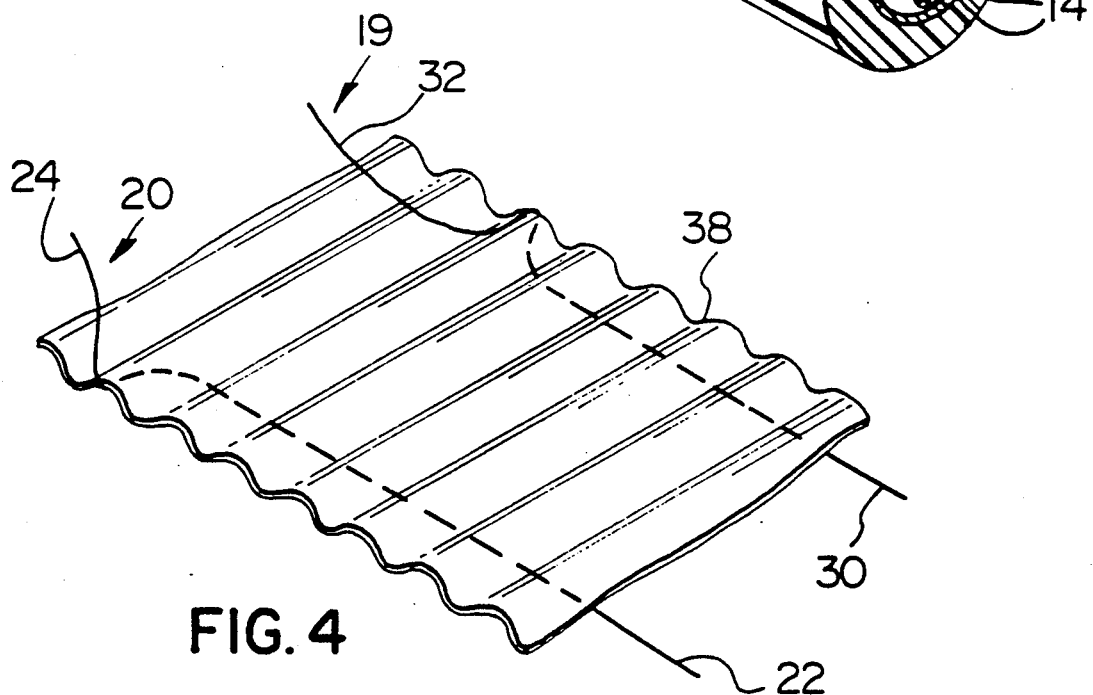
FIG. 4 shows part of the cable during manufacture to illustrate one stage in the manufacture of cable.

The ripcords are easily placed in position during cable manufacture. Before the sheath 18 is wrapped around the core, it is formed into corrugated form while still in the form of a flat strip 38 as shown by FIG. 4. Each of the ripcords 19 and 20 is guided first along one surface of the corrugated strip 38 and then along the other in alternating fashion with each ripcord extending around the appropriate edge of the strip. An adhesive is used to apply the ripcords to the peaks of the corrugations as the ripcords extend across them. Hence the ripcords are held in the desired positions during the wrapping operation of the sheath which is to follow. The strip 38 of sheath material is coated on both sides with a plastics material which softens during the extrusion process of the jacket so as to bond the jacket to the sheath. Further to this the coated material on the sheath fuses between the overlapping edge regions by the heat provided by the extrusion process so as to seal together the overlapped edge regions of the sheath. Hence the two ripcords 19 and 20 in passing between the overlapped edge regions of the sheath become embedded in the fused coating material.

It is of course not essential for a cable to have two ripcords 36 as described in the embodiment. In a modification (not shown), a cable structure is provided with one ripcord.

As may be seen from the embodiment, the sheath cannot be torn continuously along its length by either of the ripcords 19 and 20, because these lie outside the sheath in the ripcord access regions. In a modification (not shown), to enable the sheath 18 to be torn continuously along its length, another ripcord is included within the cable, this other ripcord lying entirely radially within the sheath and being accessible by opening the sheath with either or both of the ripcords 19 and 20.

What is claimed is:

1. A telecommunications cable comprising a core which includes elongate transmission elements, a metal sheath extending around the core, the sheath having overlapped edge regions extending longitudinally along the cable, an elastomeric jacket surrounding the sheath, and at least one ripcord, the ripcord extending longitudinally along the cable and alternating between lengths of the ripcord which are disposed radially within the sheath and lengths of the ripcord disposed radially outside the sheath, the ripcord extending between the overlapped edge regions as it alternates between positions inside and outside the sheath.

2. A telecommunications cable according to claim 1 which is an optical cable and the core includes elongate transmission elements comprising optical fibers.

3. A telecommunications cable according to claim 2 wherein the ripcord extends circumferentially around part of the cable in one direction between the overlapped edges, around one of the edges and then circumferentially in the other direction around part of the cable with said one edge disposed between lengths of the ripcord inside and outside of the sheath.

4. A telecommunications cable according to either of claim 1 or 2 wherein the jacket is provided upon its outer surface with designations to indicate the positions of the lengths of the ripcord which are disposed outside the sheath.

5. A method of making a telecommunications cable comprising moving a cable core along a passline while simultaneously wrapping a metal sheath around the core with longitudinally extending edge regions of the sheath overlapping one over the other, and positioning a ripcord longitudinally along the core, the ripcord alternating between lengths of ripcord which lie radially within the sheath and lengths of ripcord which are disposed radially outside the sheath, the ripcord extending between the overlapped edge regions as it alternates between positions inside and outside of the sheath.

6. A method according to claim 5 comprising disposing the ripcord in position onto the sheath before the sheath is wrapped around the cable core, by locating the ripcord in alternating lengths on both sides of the sheath with the ripcord extending around an edge of the sheath from each length to a succeeding length, the ripcord being caused to adhere to the sheath to retain the position of the ripcord, and then wrapping the sheath around the cable core whereby the ripcord has its lengths disposed in alternating fashion radially within and radially outside of the sheath.

* * * * *